US012567770B2

(12) United States Patent
Kyaw et al.

(10) Patent No.: US 12,567,770 B2
(45) Date of Patent: Mar. 3, 2026

(54) SHIELDING OF ELECTRONICS FROM MAGNETIC FIELDS

(71) Applicant: Resonant Link Medical, Inc., South Burlington, VT (US)

(72) Inventors: Phyo Aung Kyaw, Winooski, VT (US); Aaron Stein, Essex, VT (US); Charles R. Sullivan, West Lebanon, NH (US)

(73) Assignee: Resonant Link Medical, Inc., South Burlington, VT (US)

( * ) Notice: Subject to any disclaimer, the term of this patent is extended or adjusted under 35 U.S.C. 154(b) by 910 days.

(21) Appl. No.: 17/547,764

(22) Filed: Dec. 10, 2021

(65) Prior Publication Data

US 2022/0209586 A1     Jun. 30, 2022

Related U.S. Application Data

(63) Continuation of application No. PCT/US2020/061085, filed on Nov. 18, 2020.

(60) Provisional application No. 62/939,151, filed on Nov. 22, 2019.

(51) Int. Cl.
    *H01F 27/36*     (2006.01)
    *H02J 50/10*     (2016.01)
    *H02J 50/70*     (2016.01)

(52) U.S. Cl.
    CPC .............. *H02J 50/70* (2016.02); *H01F 27/36* (2013.01); *H02J 50/10* (2016.02)

(58) Field of Classification Search
    CPC ...... H01F 27/36; H01F 27/361; H01F 27/363; H01F 27/366

USPC .............................. 336/73, 84 R, 84 C, 84 M
See application file for complete search history.

(56) References Cited

U.S. PATENT DOCUMENTS

| | | | | |
|---|---|---|---|---|
| 6,962,833 | B2 * | 11/2005 | Tuttle ................. | H01L 23/3107 |
| | | | | 257/E27.005 |
| 8,193,767 | B2 * | 6/2012 | Inoue ..................... | H02J 50/10 |
| | | | | 320/108 |
| 8,232,764 | B2 * | 7/2012 | Inoue ................... | H01M 10/46 |
| | | | | 320/108 |
| 9,935,481 | B2 * | 4/2018 | Yamaguchi ........... | H02J 50/005 |
| 10,109,413 | B2 | 10/2018 | Sullivan | |
| 10,343,532 | B2 * | 7/2019 | Yuasa ................... | H02J 7/0042 |
| 10,804,709 | B2 * | 10/2020 | Arasaki .................. | H01F 38/14 |

(Continued)

FOREIGN PATENT DOCUMENTS

| | | | | |
|---|---|---|---|---|
| CN | 109215992 A | 1/2019 | | |
| JP | 2005183928 A | * 7/2005 | ............. | H01F 17/06 |

(Continued)

OTHER PUBLICATIONS

Extended European Search Report for European Application No. 20890913.5 dated Nov. 16, 2023.

(Continued)

*Primary Examiner* — Shawki S Ismail
(74) *Attorney, Agent, or Firm* — Wolf, Greenfield & Sacks, P.C.

(57)     ABSTRACT

Some aspects relate to an apparatus, comprising: a coil; an electronic circuit; and an electrically conductive shield positioned between the coil and the electronic circuit. Some aspects relate to an apparatus, comprising: a coil; an electronic circuit; and a magnetic core magnetically coupled to the coil, the magnetic core having an overhang protruding on a side of the magnetic core facing the electronic circuit.

17 Claims, 5 Drawing Sheets

(56)                    References Cited

U.S. PATENT DOCUMENTS

2006/0044929  A1*    3/2006    Spencer ............... H01L 23/552
                                                        257/E23.114
2008/0122047  A1*    5/2008    Honer .................. H01L 23/552
                                                        257/659
2009/0058358  A1      3/2009    Inoue et al.
2012/0229986  A1*    9/2012    Huda .................... H01F 27/366
                                                        336/83
2015/0189797  A1      7/2015    Oster et al.
2016/0005531  A1      1/2016    Sullivan
2017/0093198  A1      3/2017    Graham et al.
2017/0259677  A1      9/2017    Stewing et al.
2019/0036347  A1      1/2019    Arasaki et al.
2020/0111606  A1*    4/2020    Hong ...................... H01F 27/40
2021/0050136  A1      2/2021    Kyaw et al.
2021/0304949  A1      9/2021    Sullivan et al.

FOREIGN PATENT DOCUMENTS

JP              4046246  B2  *    2/2008
JP            2014-011853  A      1/2014
JP            2014-225683  A     12/2014
JP            2016-103612  A      6/2016
JP            2019-030089  A      2/2019
JP            2020-068575  A      4/2020
WO      WO-2014011059  A1  *    1/2014    .............. B60L 53/12
WO      WO-2015147128  A1  *   10/2015    .......... H01F 27/245
WO      WO 2018/018006  A1      1/2018
WO      WO-2019189138  A1  *   10/2019    ............. B60L 13/03

OTHER PUBLICATIONS

International Preliminary Report on Patentability for International Application No. PCT/US2020/061085 mailed Jun. 2, 2022.
PCT/US2020/061085, Jan. 25, 2021, Invitation to Pay Additional Fees.
PCT/US2020/061085, Mar. 26, 2021, International Search Report and Written Opinion.
Invitation to Pay Additional Fees for International Application No. PCT/US2020/061085 mailed Jan. 25, 2021.
International Search Report and Written Opinion for International Application No. PCT/US2020/061085 mailed Mar. 26, 2021.

* cited by examiner

| Shield Shape | Loss Reduction | Shield Shape | Loss Reduction |
|---|---|---|---|
|  | 22.6% |  | 5.6% |
|  | 30.8% |  | 16.3% |
|  | 31.55% |  | 11.1% |
|  | 21.91% |  | 36.6% |
|  | 27.42% |  | 30.92% |
|  |  |  | 26.18% |

FIG. 3E

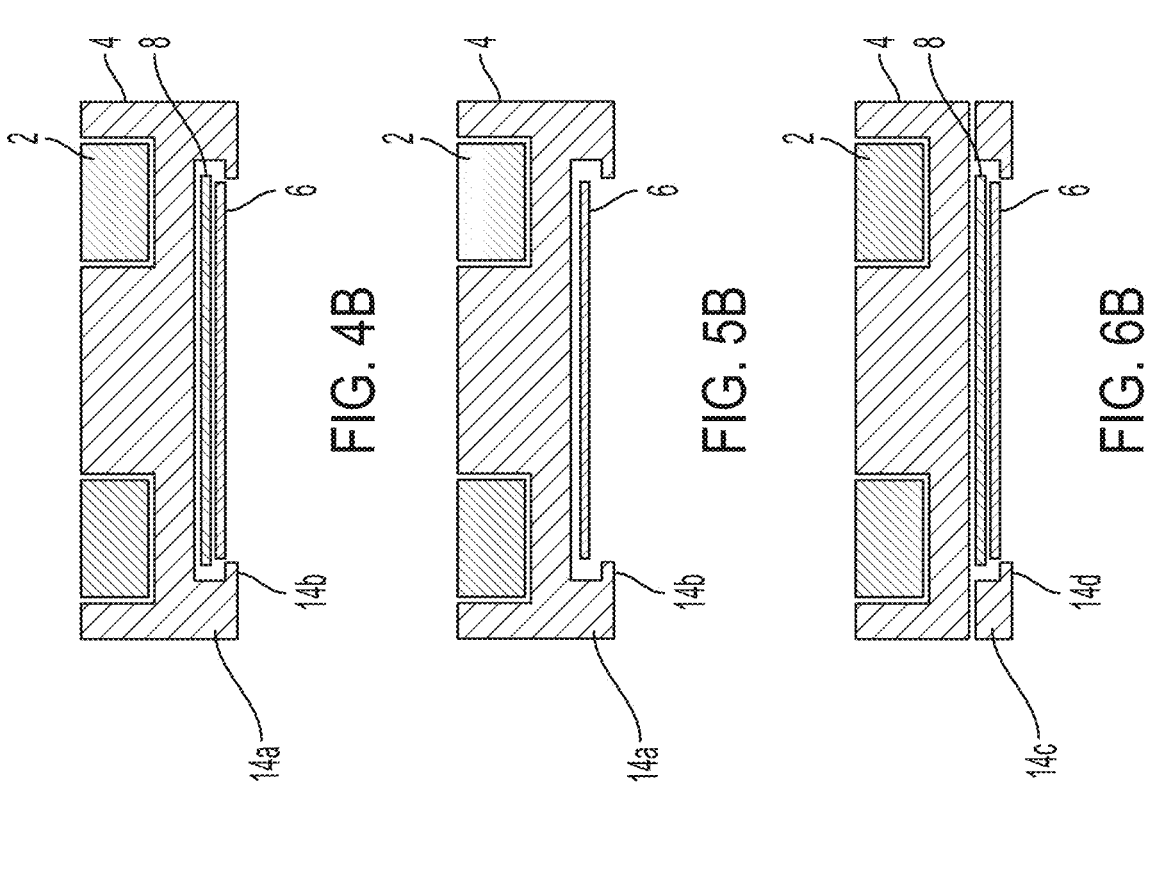
FIG. 4A
FIG. 4B
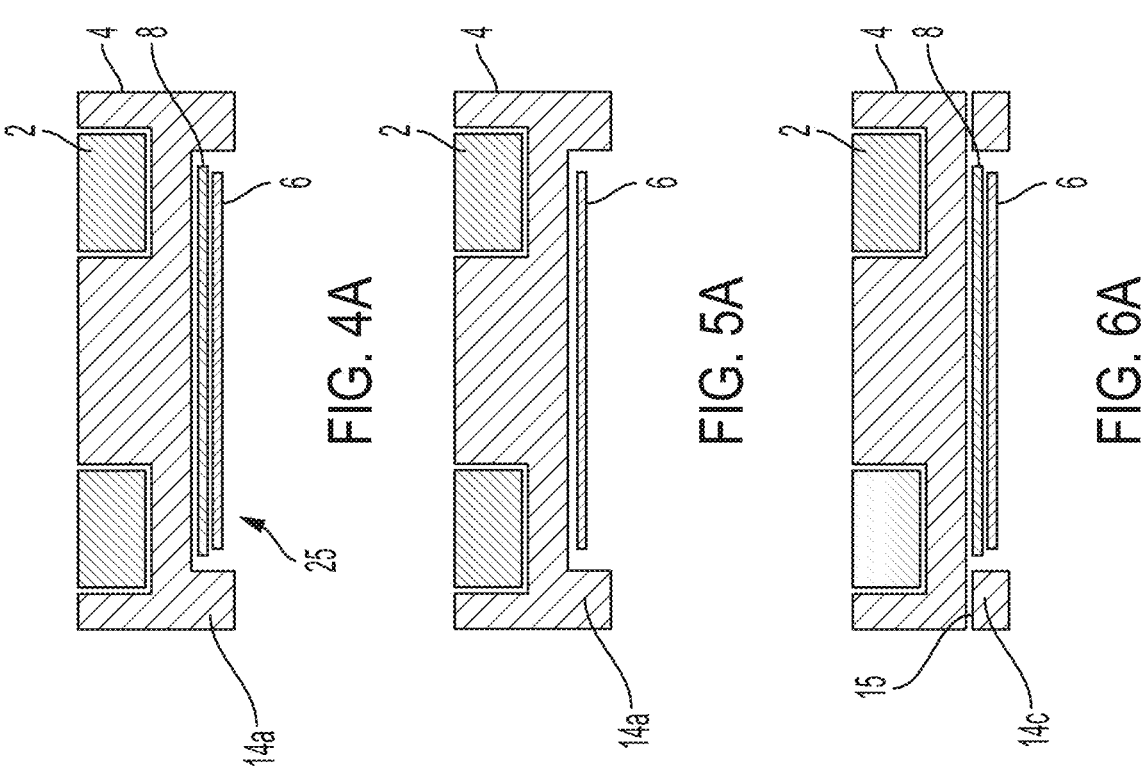
FIG. 5A
FIG. 5B
FIG. 6A
FIG. 6B

SHIELDING OF ELECTRONICS FROM MAGNETIC FIELDS

RELATED APPLICATIONS

This application claims priority under 35 U.S.C. § 120 to and is a continuation of International Application No. PCT/US2020/061085, filed Nov. 18, 2020, which claims the benefit under 35 U.S.C. § 119(e) of the filing date of U.S. Provisional Application Ser. No. 62/939,151, filed Nov. 22, 2019, each of which is incorporated herein by reference.

BACKGROUND

1. Technical Field

The techniques described herein relate generally to shielding of electronics from magnetic fields such as those produced by windings (e.g., in a wireless power transfer system).

2. Discussion of the Related Art

Various devices include coils that produce magnetic fields. Examples include inductors, transformers and coils of a wireless power transfer system, by way of example.

A wireless power transfer system can transfer energy wirelessly through magnetic coupling. Various types of wireless power transfer systems exist, such as inductive systems and resonant systems.

SUMMARY

Some aspects relate to an apparatus, comprising: a coil; an electronic circuit; and an electrically conductive shield positioned between the coil and the electronic circuit.

The apparatus may further comprise a magnetic core magnetically coupled to the coil, wherein the electrically conductive shield is positioned between the magnetic core and the electronic circuit.

The electrically conductive shield may have a planar section.

The electrically conductive shield may have an overhang protruding on a side of the electrically conductive shield facing the electronic circuit.

The overhang may have at least a portion that is straight.

The overhang may have at least a portion that is curved.

The overhang may be curled in a curved manner or a stepped manner in an inward direction or an outward direction.

The magnetic core may have an overhang protruding on a side of the magnetic core facing the electronic circuit.

The electrically conductive shield may comprise a metal.

The electrically conductive shield may have a thickness of greater than a skin depth at a fundamental frequency of current in the coil.

The electronic circuit may be electrically coupled to the coil.

The coil may be configured to produce a magnetic field and the electronic circuit may be within the magnetic field.

The coil may be proximate the electronic circuit.

The electronic circuit may comprise an inverter of a wireless power transmitter or a rectifier of a wireless power receiver.

Some aspects relate to an apparatus, comprising: a coil; an electronic circuit; and a magnetic core magnetically coupled to the coil, the magnetic core having an overhang protruding on a side of the magnetic core facing the electronic circuit.

The apparatus may further comprise an electrically conductive shield between the magnetic core and the electronic circuit.

The electrically conductive shield may have an overhang protruding on a side of the electrically conductive shield facing the electronic circuit.

The overhang of the magnetic core may have a first overhang section protruding on the side of the magnetic core facing the electronic circuit and the magnetic core may also have a second overhang section protruding in an inward direction.

The electrically conductive shield may have a planar section.

The electrically conductive shield may comprise a metal.

The electrically conductive shield may have a thickness of greater than a skin depth at a fundamental frequency of current in the coil.

The overhang of the electrically conductive shield may have at least a portion that is straight.

The overhang of the electrically conductive shield may have at least a portion that is curved.

The overhang of the electrically conductive shield may be curled in a curved manner or a stepped manner in an inward direction or an outward direction.

The electronic circuit may be electrically coupled to the coil.

The coil may be configured to produce a magnetic field and the electronic circuit may be within the magnetic field.

The coil may be proximate the electronic circuit.

The electronic circuit may comprise an inverter of a wireless power transmitter or a rectifier of a wireless power receiver.

The apparatus may include an inductor or transformer comprising the coil.

The apparatus may be used in wireless power transfer.

Some aspects relate to a method of using the apparatus.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIGS. 3A-3E show a conductive shield having an overhang which may have various shapes, according to some embodiments.

FIGS. 4A-4B show a magnetic core having an overhang, which may have various shapes, as well as a conductive shield, according to some embodiments.

FIGS. 5A-5B show a magnetic core having an overhang and no conductive shield, according to some embodiments.

FIGS. 6A-6B show a magnetic core having an overhang portion that is physically separated from the rest of the magnetic core, according to some embodiments.

DETAILED DESCRIPTION

A wireless power transfer system includes a wireless power transmitter and a wireless power receiver, each of which includes a power transfer coil (also herein termed "coil" or "winding"). A wireless power transmitter may include a transmit coil that may be coupled to a power source via power electronics. The power electronics may invert a DC (direct current) signal into an AC (alternating current) signal that can be transmitted wirelessly to a wireless power receiver through electromagnetic induction. A wireless power receiver may include a receive coil and power electronics (e.g., a rectifier) that couples the receive coil to a load. In operation, a wireless power transmitter and receiver are physically separated from one another by some distance, and the wireless power transmitter inductively transfers power to the wireless power receiver.

In many applications, proximity of electronics and the transmit or receive coils may be necessary or convenient. For example, placement of electronic circuits such as power electronic circuits on the back of an transmit coil or a receive coil can reduce the overall footprint of a wireless power transmitter or receiver.

The performance of a wireless power transfer system may be constrained by the magnetic coupling factor (k) between the coils and the quality factor (Q) of the coils. The magnetic coupling factor (k) may be limited by the wireless gap, so achieving high-Q can often help achieve high-performance wireless power transfer.

The inventors have recognized and appreciated that the placement of an electronic circuit (e.g., power electronics circuit) proximal to the wireless power transmit or receive coils can be detrimental to the Q of the coils. Eddy currents induced in the electronic circuit by the magnetic field create additional power loss—limiting the Q of the coils. A similar issue may arise with other devices (e.g., transformers or inductors) with a current-carrying coil positioned near electronics which may or may not be electrically coupled to the coil.

Figure 1A:
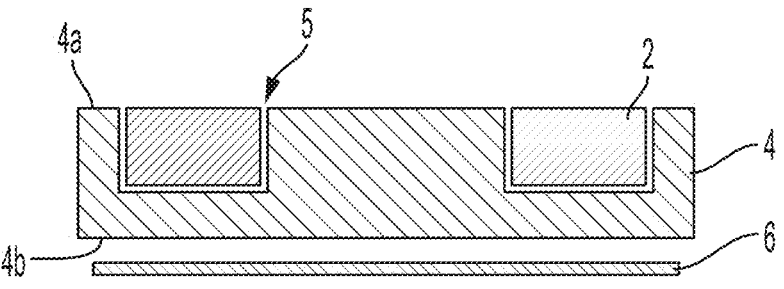
FIG. 1A shows a cross-section of a winding within a magnetic core.
Figure 2:
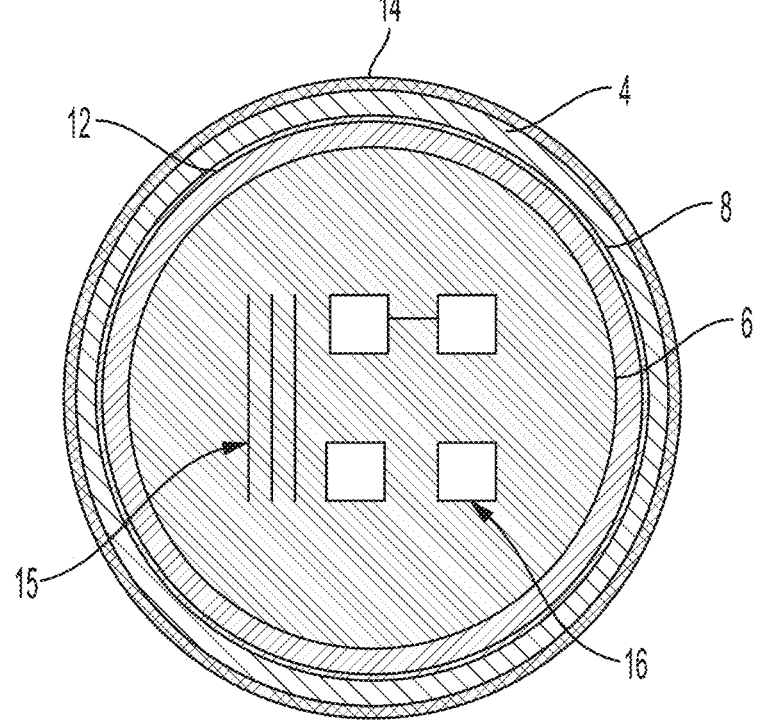
FIG. 2 shows the bottom plan view of a winding with a conductive shield positioned between the electronic circuit and the magnetic core, according to some embodiments.

FIG. 1A shows a cross-section of a winding 2 within a magnetic core 4, on the front side 4a of the magnetic core 4. The magnetic core 4 may include a cavity 5 for accommodating the winding 2. The winding 2 need not fill the entire cavity 5, but may fill the cavity 5. The cavity 5 and winding 4 may have any suitable shape in plan view, such as an annular shape, or an elliptical shape, for example. An electronic circuit 6, which may include a printed circuit board (PCB) with conductive traces 15 and other components 16 (e.g., an inverter, a rectifier circuit, etc.), as illustrated in FIG. 2, is placed on the back 4b of the magnetic core 4. The winding 2 may be a transmit coil of a wireless power transmitter. When the winding 2 is a transmit coil, the electronic circuit 6 may include transmit power electronics such as an inverter, for example, which is electrically connected to the transmit coil to drive the transmit coil. Alternatively, the winding 2 may be a receive coil of a wireless power receiver. When the winding 2 is a receive coil, the electronic circuit 6 may include receive power electronics such as a rectifier, for example, which is electrically connected to the receive coil to receive and process power from the receive coil. Current within the winding 2 produces a magnetic field that, in turn, produces eddy currents in the components on the PCB and in the traces of the PCB. Power loss (also termed "loss" or "losses") is concentrated near the edges of conductors so the edge of each trace incurs an especially large amount of loss.

Figure 1B:
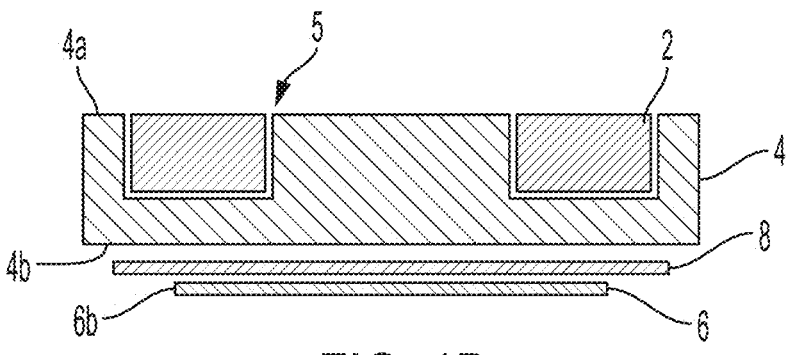
FIG. 1B shows that a conductive shield may be positioned between the electronic circuit and the magnetic core, according to some embodiments.

The inventors have recognized and appreciated that an electronic circuit 6 may be shielded from the magnetic field by providing an electrically conductive shield (also termed a "conductive shield" or "shield") between the winding 2 and the electronic circuit 6. FIG. 1B shows that a conductive shield 8 may be positioned between the electronic circuit 6 and the magnetic core 4. Such a conductive shield 8 may be realized in a variety of ways. For example, a conductive material may be placed on the back 4b of the magnetic core 4 or on the bottom 6b of a printed circuit board (PCB), or the PCB may be constructed so that the bottom layer (layer closest to the magnetic core 4) is a region of conductive material.

FIG. 2 shows a bottom plan view corresponding to FIG. 1B, in which a conductive shield 8 is positioned between the electronic circuit 6 and the magnetic core 4. In this example, the magnetic core 4, electronic circuit 6 and conductive shield 8 each has a circular shape. However, the techniques and structures described herein are not limited in this respect, as the magnetic core 4, electronic circuit 6 and conductive shield 8 may have any suitable shapes, and their shapes may be the same as one another or different from one another. In this example, the magnetic core 4 takes up more area in plan view than the conductive shield 8 and completely covers conductive shield 8, which in turn takes up more area in plan view than the electronic circuit 6 and completely covers electronic circuit 6. However, the techniques described herein are not limited in these respects, as they may have different relative areas or may not completely cover one another. It should be appreciated that in some embodiments conductive shield 8 completely covers electronic circuit 6 to provide a high degree of shielding.

The conductive shield 8 may be made of any electrically conductive material or combination of materials, including but not limited to one or more metals such as silver, copper, aluminum, gold and titanium, and non-metallic materials such as graphite. The electrically conductive material or combination of materials may have an electrical conductivity of higher than 1 MS/m, optionally higher than 200 kS/m. A complete shielding of the electronic circuit 6 from the magnetic field may require a conductive shield that is thicker than a skin depth at the operating frequency. The operating frequency is the fundamental frequency of current in the coil, which may be any suitable frequency. Some examples of wireless power transfer that may be performed by the devices described herein include inductive and resonant wireless power transfer. However, the techniques described herein are not limited in this respect. Further, complete shielding is not required, and a conductive shield thinner than, but close to (e.g., greater than 10% or 50% of a skin depth) a skin depth may also be effective in reducing the loss in the components on the PCB and in the traces of the PCB. However, the techniques and devices described herein are not limited as to the particular material of the conductive shield.

The magnetic core 4 may be, wholly or partially, made of one or more ferromagnetic materials which has/have a relative permeability of greater than 1, optionally greater than 10, and in some cases no more than 1 million. The magnetic core materials may include, but are not limited to, one or more of iron, various steel alloys, cobalt, ferrites including manganese-zinc (MnZn) and/or nickel-zinc (NiZn) ferrites, nano-granular materials such as Co—Zr—O, and powdered core materials made of powders of ferromagnetic materials mixed with organic or inorganic binders. However, the techniques and devices described herein are not limited as to the particular material of the magnetic core 4. The shape of the magnetic core may be: a pot core, a sheet (I core), a sheet with a center post, a sheet with an outer rim, RM core, P core, PH core, PM core, PQ core, E core, EP core, or EQ core, by way of example. However, the techniques and devices described herein are not limited to a particular magnetic core shape.

The winding 2 may be, wholly or partially, made of conductive materials including but not limited to one or more metals such as silver, copper, aluminum, gold. The winding 2 may be constructed, but not limited to, using wire, magnet wire, stranded wire, litz wire, printed circuit board traces, conductors laminated on a substrate, foil layers, multilayer self-resonant structures, modified multilayer self-resonant structures, solid metal, or any combination thereof.

The inventors have recognized and appreciated that the shape of the shield 8 can impact the magnitude of the power losses caused by eddy currents. In some embodiments, the shield 8 has an edge that is shaped to guide the magnetic field around the edge of the conductive shield 8. For example, the edge of the shield 8 may have an "overhang" extending in the direction of the electronics protected by the conductive shield. The overhang may have various shapes, examples of which are described below.

Alternatively or additionally, the magnetic core may have a region that is shaped to guide the magnetic field around the edge of the conductive shield, and may extend in the direction of the electronics being protected. Such a region of a magnetic core is also referred to as an "overhang." One or more "overhangs" of electrically conductive material, magnetic material, or both can be used to reduce power loss induced in the electronic circuit by eddy currents. This allows a circuit or other lossy material to be placed physically close to the winding 2 without limiting the Q of the winding 2. Various embodiments are described below.

In some embodiments, the conductive shield 8 has one or more overhangs 12 that extend away from the magnetic core any or all sides of the shield 8. Examples of overhang shapes are shown in FIGS. 3A-3D. The overhang of conductive material reduces lateral current crowding in the conductive shield by shaping the edge of the shield to more closely follow the magnetic flux lines. This can reduce losses in the shield up to 40% or more. This can be implemented using various techniques.

Figures 3A, 3B, 3C, 3D:
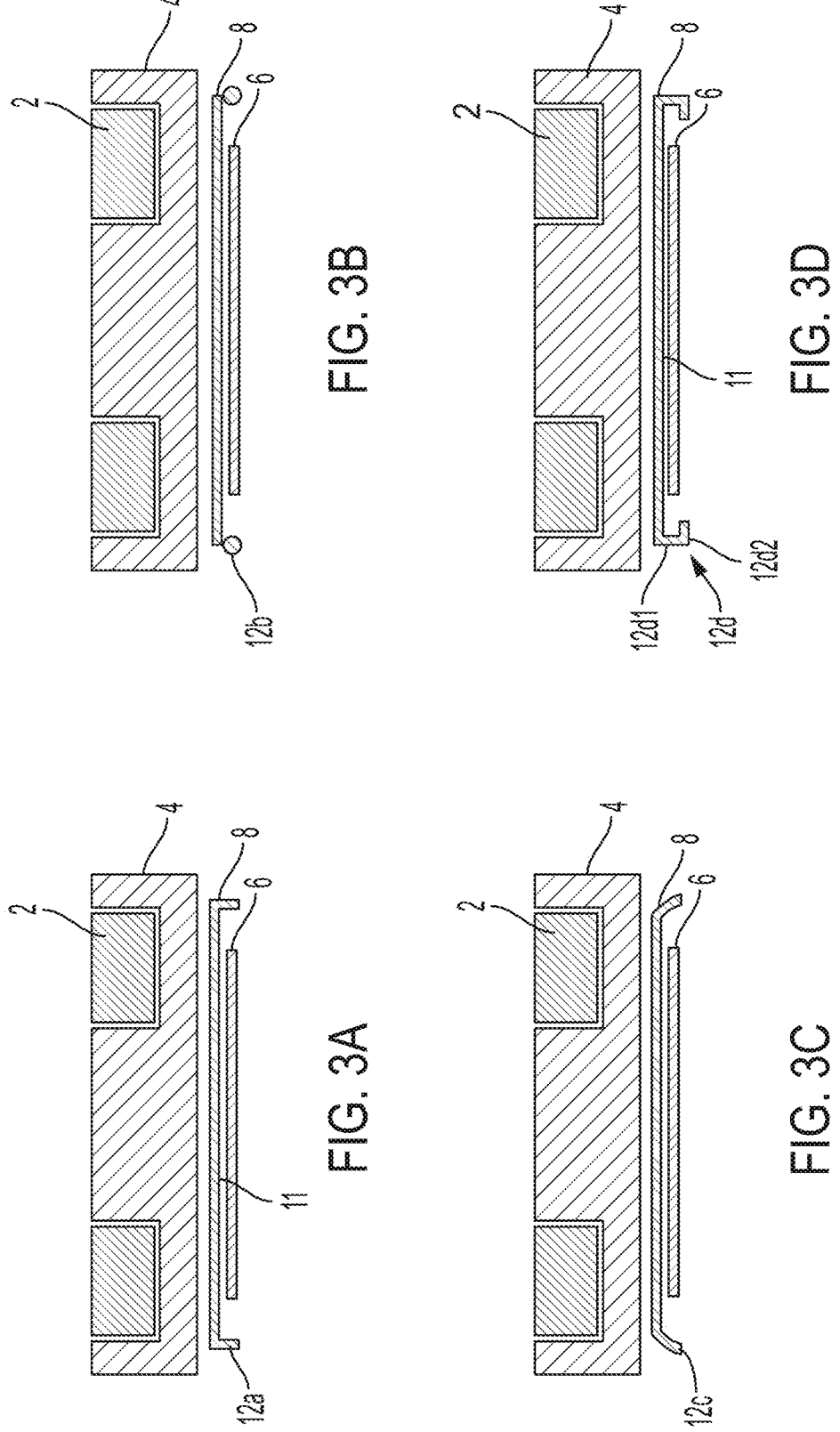

FIG. 3A shows an embodiment of a conductive shield with an overhang that can be manufactured using standard PCB technology. The position of the overhang 12 in plan view is shown in FIG. 2. In the embodiment of FIG. 3A, the shield 8 includes a planar portion 11 and an overhang 12a that extends from the planar portion 11 at a 90 degree angle to the planar portion 11 in the direction away from the magnetic core 4. The bottom conductive layer of a PCB can form the planar portion 11 of the shield 8 and vias in the PCB can be used to form the overhang 12a. The vias may be formed around the perimeter of the planar portion 11. As another example, edge plating on a PCB may be used to form the overhang 12a.

As another example, FIG. 3B depicts a round overhang 12b. Round overhang 12b can be created by attaching (e.g., soldering) a wire to the bottom edge of a planar portion 11 of the shield, for example. The round overhang 12b may extend around the perimeter of the planar portion 11.

FIG. 3C shows an example of a shield 8 with a curved overhang 12c at the edge of the planar portion 11, curving toward the electronic circuit 6 and away from the magnetic core 4.

FIG. 3D shows an example of a shield with an L-shaped overhang 12d that has a section 12d1 extending downward, away from the magnetic core 4, and a section 12d2 extending toward the electronic circuit 6. Section 12d1 may extend from the planar portion 11 at a 90 degree angle to the planar portion 11. Section 12d2 may extend from the section 12d1 at a 90 degree angle to the section 12d1, in an inward direction. However, the techniques described herein are not limited to the number of sections in the overhang 12, or their angles with respect to one another.

FIG. 3E shows the performance of the same and additional shapes as shown in FIGS. 3A-3D. FIG. 3E shows various shapes of conductive shields with overhangs and the simulated performance increase (power loss reduction) compared to a similar shield with no overhangs. Each illustration depicts the shape of an edge of an overhang 12. As discussed above, the overhang may extend in a direction away from the magnetic core 4.

In some embodiments, the magnetic core 4 may have one or more overhangs 14 extending on the side of the electronic circuit 6. One or more overhangs 14 of magnetic core material may help to shape the magnetic field around the conductive shield 8 to reduce power loss. The position of the overhang 14 in plan view is shown in FIG. 2.

FIG. 4A shows an embodiment with a single section of core overhang 14a. Section 14a may be an extension of the magnetic core material that extends on the side of the electronic circuit 6 and shield 8. The section 14a may extend around the perimeter of the magnetic core 4, as shown in FIG. 2. Section 14a may help to shape the magnetic field so that it extends around the electronic circuit 6. In some embodiments, the overhang 14 and magnetic core form a cavity 25 in which the electronic circuit 6 and shield 8 are disposed. In some embodiments, the electronic circuit 6 may be completely within the cavity 25 (e.g., above the lowest portion of the overhang 14). However, the techniques and structures described herein are not limited in this respect, as the electronic circuit 6 may be partially within the cavity 25 in some embodiments.

FIG. 4B shows an embodiment with two sections of core overhang 14a and 14b. Section 14b may extend inwardly at an angle of 90 degrees with respect to overhang 14a. Overhang section 14b may help to further shape the field so that it extends around the electronic circuit 6. The overhang section 14b may be at a position below electronic circuit 6 but not overlapping electronic circuit 6 in cross section, as shown in FIG. 4B. However, in other embodiments overhang section 14b may overlap with electronic circuit 6 in cross section.

Finite element simulations show that the addition of this core material overhang can reduce shield loss by 55% for the embodiment of FIG. 4A and 61% for the embodiment of FIG. 4B.

An overhang 14 of core material can be used even if a conductive shield 8 is not present, as it will help straighten the field lines around the conductive traces of the printed circuit board and reduce loss. FIG. 5A shows an embodiment similar to the embodiment of FIG. 4A, but without a shield 8. FIG. 5B shows an embodiment similar to the embodiment of FIG. 4B, but without a shield 8.

In some embodiments, a magnetic core overhang can be implemented such that the overhang is physically separated from the rest of the magnetic core material. FIG. 6A and FIG. 6B show such implementations. FIG. 6A shows a magnetic core overhang 14*c* similar to overhang 14*a*, but physically separated from the rest of the magnetic core 4 by a gap 15. The gap 15 may include a non-magnetic material such as air, a non-magnetic adhesive, or any other suitable material. FIG. 6B shows a magnetic core overhang similar to that of FIG. 4B with a portion 14*d* extending inwardly from the portion 14*c*, but with a gap 15 separating the overhang 14*c,d* from the rest of the magnetic core 4.

Figure 7A:
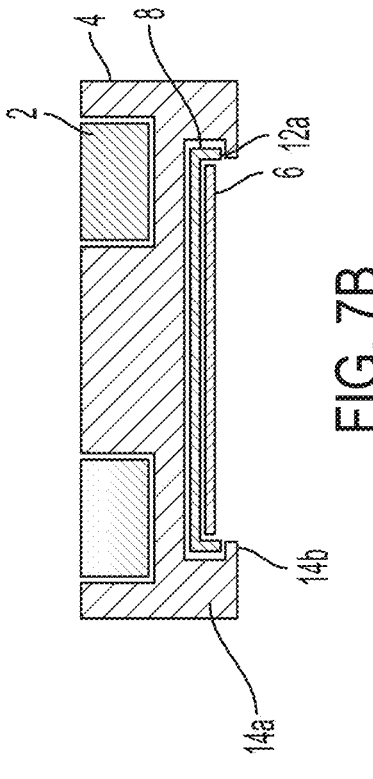
FIGS. 7A-7D show examples of structures including both a magnetic core with an overhang and a conductive shield with an overhang, according to some embodiments.
Figure 7B:
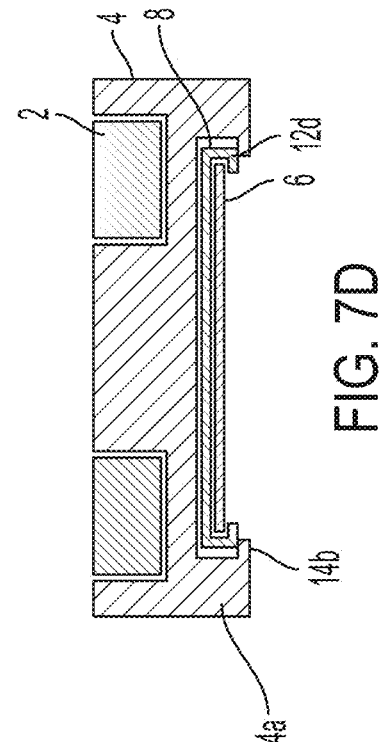
Figure 7C:
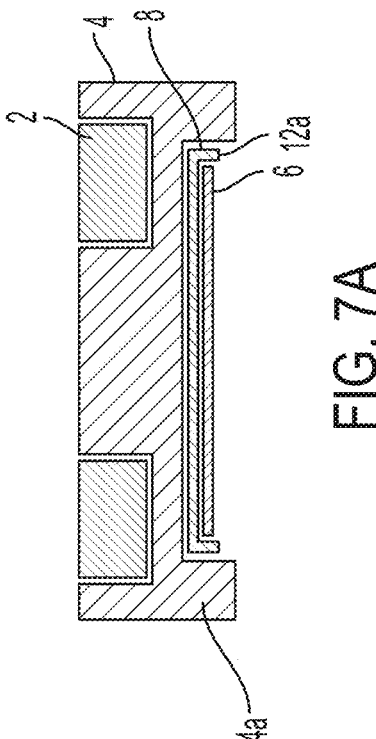
Figure 7D:
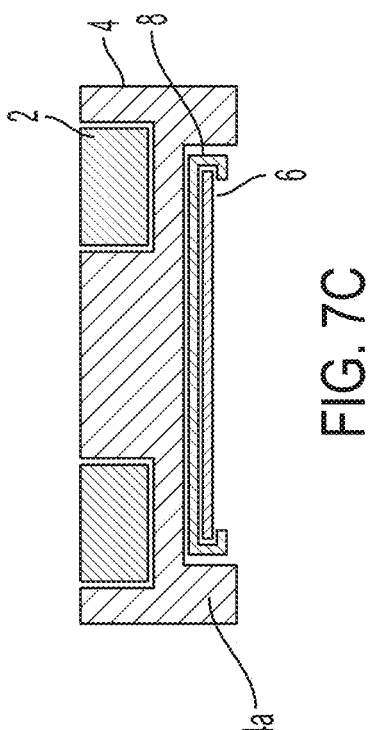

In some embodiments, overhangs may be included in both the magnetic core and the conductive shield. Any shape of magnetic core overhang may be combined with any shape of conductive shield overhang. For example, FIG. 7A shows a single-segment shield overhang 12*a* as illustrated in FIG. 3A and a single-segment magnetic core overhang 14*a* as illustrated in FIG. 4A, the combination of which results in 50.4% reduction in shield loss. FIG. 7B shows a double-segment magnetic core overhang 14*a, b* as shown in FIG. 4B with a single-segment shield overhang 12*a* as illustrated in FIG. 3A, which results in a 65.7% reduction in shield loss. FIG. 7C shows a single-segment magnetic core overhang 14*a* as illustrated in FIG. 4A and a double-segment shield overhang 12*d*, as shown in FIG. 3D, which results in a 65.5% reduction in shield loss. FIG. 7D shows a double-segment shield overhang 12*d*, as shown in FIG. 3D and a double-segment magnetic core overhang 14*a, b* as shown in FIG. 4B, which results in a 70.3% reduction in shield loss. The combination approach can be utilized with any combination of overhangs.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:
1. An apparatus, comprising:
a coil;
an electronic circuit;
an electrically conductive shield positioned between the coil and the electronic circuit; and
a magnetic core magnetically coupled to the coil, wherein the electrically conductive shield is positioned between the magnetic core and the electronic circuit, and wherein the magnetic core has a magnetic core overhang protruding at an outer edge of the magnetic core on a side of the magnetic core facing the electronic circuit, wherein the electronic circuit includes a printed circuit board and the magnetic core overhang protrudes past the printed circuit board.

2. The apparatus of claim 1, wherein the electrically conductive shield has a planar section.

3. The apparatus of claim 1, wherein the electrically conductive shield has a conductive shield overhang protruding on a side of the electrically conductive shield facing the electronic circuit.

4. The apparatus of claim 3, wherein the conductive shield overhang has at least a portion that is straight.

5. The apparatus of claim 3, wherein the conductive shield overhang has at least a portion that is curved.

6. The apparatus of claim 3, wherein the conductive shield overhang is curled in a curved manner or a stepped manner in an inward direction or an outward direction.

7. The apparatus of claim 1, wherein the electrically conductive shield comprises a metal.

8. The apparatus of claim 1, wherein the electrically conductive shield has a thickness of greater than a skin depth at a fundamental frequency of current in the coil.

9. The apparatus of claim 1, wherein the electronic circuit is electrically coupled to the coil.

10. The apparatus of claim 1, wherein the electronic circuit comprises an inverter of a wireless power transmitter or a rectifier of a wireless power receiver.

11. The apparatus of claim 1, wherein the magnetic core overhang is separated from a second portion of the magnetic core by a gap.

12. The apparatus of claim 1, wherein the magnetic core overhang has an inner edge within a radius of the coil.

13. An apparatus, comprising:
a coil;
an electronic circuit; and
a magnetic core magnetically coupled to the coil, the magnetic core having a magnetic core overhang protruding at an outer edge of the magnetic core on a side of the magnetic core facing the electronic circuit,
wherein the electronic circuit includes a printed circuit board and the magnetic core overhang protrudes past the printed circuit board.

14. The apparatus of claim 13, wherein the magnetic core overhang has a first overhang section protruding on the side of the magnetic core facing the electronic circuit and the magnetic core overhang also has a second overhang section protruding in an inward direction.

15. The apparatus of claim 13, wherein the electronic circuit is electrically coupled to the coil.

16. The apparatus of claim 13, wherein the electronic circuit comprises an inverter of a wireless power transmitter or a rectifier of a wireless power receiver.

17. The apparatus of claim 13, wherein the magnetic core overhang has an inner edge within a radius of the coil.

* * * * *